United States Patent [19]
Ishikawa et al.

[11] Patent Number: 5,497,438
[45] Date of Patent: Mar. 5, 1996

[54] OPTICAL TRANSMISSION AND RECEPTION MODULE HAVING COUPLED OPTICAL WAVEGUIDE CHIPS

[75] Inventors: Tadasu Ishikawa, Tokyo; Yoshinari Kozuka; Yukihisa Osugi, both of Nagoya, all of Japan

[73] Assignees: Nippon Hoso Kyokai, Tokyo; NGK Insulators, Ltd., Nagoya, both of Japan

[21] Appl. No.: 316,346

[22] Filed: Sep. 30, 1994

[30] Foreign Application Priority Data

Oct. 1, 1993 [JP] Japan .................. 5-247055

[51] Int. Cl.⁶ ........................... G02B 6/26
[52] U.S. Cl. ............... 385/38; 385/47; 385/48; 385/65
[58] Field of Search ............... 385/15–18, 31, 385/38, 39, 44, 45, 47–52, 65, 83

[56] References Cited

U.S. PATENT DOCUMENTS

| | | | |
|---|---|---|---|
| 4,165,496 | 8/1979 | DiDomenico, Jr. et al. | 385/48 X |
| 4,285,571 | 8/1981 | Winzer | 385/47 X |
| 4,373,775 | 2/1983 | Gasparian | 385/47 |
| 4,900,118 | 2/1990 | Yanagawa et al. | 385/49 X |
| 5,390,266 | 2/1995 | Heitmann et al. | 385/44 |

FOREIGN PATENT DOCUMENTS

| | | |
|---|---|---|
| 0107791A1 | 5/1984 | European Pat. Off. . |
| 0292331A3 | 11/1988 | European Pat. Off. . |
| 0509789A2 | 10/1992 | European Pat. Off. . |
| 2549243A | 1/1985 | France . |
| 63-289509 | 11/1988 | Japan .................. 385/47 |
| 1-118806 (A) | 5/1989 | Japan . |

OTHER PUBLICATIONS

Jackson et al., SPIE vol. 994, (1988), pp. 40–47, "Optical Fiber Coupling Approaches for Multi-Channel Laser and Detector Arrays".

*Primary Examiner*—John D. Lee
*Attorney, Agent, or Firm*—Ronald J. Kubovcik

[57] ABSTRACT

A first optical waveguide chip has a ceramic substrate and a cover, and the ceramic substrate has a V groove and guide grooves with an optical fiber being fixed in the V groove. A second optical waveguide chip has a ceramic substrate and a cover, and the ceramic substrate has a V groove and guide grooves with an optical fiber being fixed in the V groove. The first and second optical waveguide chips have respective end faces inclined 62° to the direction in which light is propagated through the optical fibers. The first and second optical waveguide chips are positioned by guide pins intimately fitted in the guide grooves.

22 Claims, 7 Drawing Sheets

OPTICAL TRANSMISSION AND RECEPTION MODULE HAVING COUPLED OPTICAL WAVEGUIDE CHIPS

BACKGROUND OF THE INVENTION

1. Field of the Invention

The present invention relates to an optical component, and more particularly to an optical transmission/reception module for use in optical CATV and optical communication fields.

2. Description of the Related Art

As the optical fiber transmission technology advances, various research activities are directed to optical CATV and optical communication systems which utilize the wide-band characteristics of the optical fibers. It is expected that there will be realized a Fiber-To-The-Home (FTTH) system which has optical fibers led to homes for starting various information services in the near future. For realizing a full-fledged FTTH system, it is necessary to reduce the size and cost of optical terminals connected to respective homes.

The FTTH system requires a bidirectional optical transmission mode which needs to be performed by an optical reception/transmission module comprising a light source for emitting an optical signal, a light-detecting element for converting the optical signal into an electric signal, and an optical coupler for transmitting light from the optical source and light to the light-detecting element to optical fibers that are used to transmit light.

Figure 1:
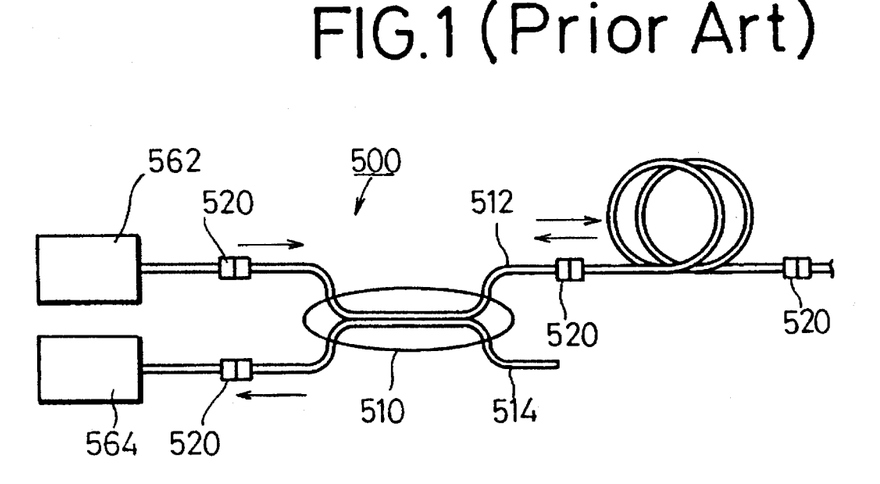
FIG. 1 is a schematic view of a conventional optical reception/transmission module.

FIG. 1 of the accompanying drawings schematically shows a conventional optical reception/transmission module 500. As shown in FIG. 1, the optical reception/transmission module 500 comprises a laser diode 562, a photodiode 564, and an optical coupler 510. The optical coupler 510 comprises two optical fibers 512, 514 fused together. Therefore, it is difficult to reduce the length of the optical coupler 510. The optical coupler 510 and the laser diode 562, and the optical coupler 510 and the photodiode 564 are connected to each other by optical fibers through fused regions 520 thereof. Consequently, the optical reception/transmission module 500 is relatively long in its entirety. If a plurality of optical reception/transmission modules 500 are required, then since the individual optical reception/transmission modules 500 have to be arrayed horizontally or vertically, the space taken up by the optical reception/transmission modules 500 increases and the cost of the entire system also increases as the number of optical reception/transmission modules 500 increases.

As described above, inasmuch as the optical coupler 510 is composed of the two optical fibers 512, 514 fused together and the optical reception/transmission module 500 is made up of three components, i.e., the laser diode 562, the photodiode 564, and the optical coupler 510, the conventional optical reception/transmission module 500 has been problematic with respect to both the space occupied thereby and the cost thereof. In the case where the optical reception/transmission module 500 is incorporated in an on-demand access system of CATV, it is necessary to use many optical couplers 510 and optical reception/transmission modules 500 in a transmission terminal. Therefore, such an on-demand access system with the conventional optical couplers 510 and optical reception/transmission modules 500 takes up a large space and is expensive.

SUMMARY OF THE INVENTION

It is an object of the present invention to provide an optical component such as an optical coupler, an optical reception/transmission module, or the like which has a reduced size.

Another object of the present invention is to provide an optical component such as an optical coupler, an optical reception/transmission module, or the like which can easily be fabricated in an integrated configuration, so that the optical component can be reduced in size and cost.

According to the present invention, there is provided an optical component comprising a first optical waveguide chip having a first optical waveguide, first and second end faces at which the first optical waveguide is exposed, and a first guide groove, and a second optical waveguide chip having a second optical waveguide, third and fourth end faces at which the second optical waveguide is exposed, and a second guide groove, the second end face being inclined to a direction in which light is propagated through the first optical waveguide, the third end face being inclined to a direction in which light is propagated through the second optical waveguide, the first optical waveguide of the first optical waveguide chip and the second optical waveguide of the second optical waveguide chip being optically coupled to each other with reference to pins intimately placed in the first and second guide grooves, the second and third end faces extending substantially parallel to each other with a layer interposed therebetween which has a refractive index that is different from the refractive index of at least one of the first and second optical waveguides, the arrangement being such that a portion of light propagated from the first optical waveguide to the second optical waveguide is reflected out of at least one of the first and second optical waveguide chips by at least one of the second end face of the first optical waveguide chip and the third end face of the second optical waveguide chip.

With the above arrangement, the second end face of the first optical waveguide chip is inclined to the direction of propagation of light through the first optical waveguide, and the third end face of the second optical waveguide chip is inclined to the direction of propagation of light through the second optical waveguide, and the second and third end faces extend substantially parallel to each other with a layer interposed therebetween which has a refractive index that is different from the refractive index of at least one of the first and second optical waveguides. Therefore, a portion of light propagated from the first optical waveguide to the second optical waveguide is reflected out of at least one of the first and second optical waveguide chips by at least one of the second end face of the first optical waveguide chip and the third end face of the second optical waveguide chip.

Inasmuch as a portion of light propagated from the first optical waveguide to the second optical waveguide is reflected out of at least one of the first and second optical waveguide chips by at least one of the second end face of the first optical waveguide chip and the third end face of the second optical waveguide chip, the optical component thus constructed has a length smaller than a conventional optical component which is composed of two optical fibers fused to each other.

According to the present invention, the first optical waveguide is disposed in the first optical waveguide chip, and the second optical waveguide is disposed in the second optical waveguide chip, and the first and second optical waveguides are optically coupled to each other and light is emitted from the first optical waveguide chip and/or the second optical waveguide chip by the inclined end faces of the first and second optical waveguide chips. If a plurality of light paths are required, then a plurality of first optical waveguides may be disposed in the first optical waveguide chip, and a plurality of second optical waveguides may be disposed in the second optical waveguide chip. As a result, the optical component may easily be fabricated in an integrated configuration, and reduced in size and cost.

The first and second guide grooves are defined in the first and second optical waveguide chips, respectively, and the first and second optical waveguide chips are optically coupled to each other with reference to the pins intimately held in the first and second guide grooves. Therefore, the first and second optical waveguides can easily be positioned relative to each other.

Preferably, each of the first and second optical waveguides comprises an optical fiber, and each of the first and second optical waveguide chips has a substrate having a V groove of a V-shaped cross section or a U groove of a U-shaped cross section defined therein for placing the optical fiber therein, the optical fiber being fixed in the V or U groove.

Since the optical fibers of the first and second optical waveguides are of the same material as the optical fiber used for transmission, these optical fibers can easily be spliced to each other with a small optical loss.

Each of the first and second optical waveguide chips has a cover for fixing the optical fiber in the V or U groove, the optical fiber being fixed in the V or U groove by the substrate and the cover. The optical fiber can thus be positioned accurately in the optical waveguide chip.

Further preferably, each of the first and second optical waveguide chips has a cover for fixing the optical fiber in the V or U groove, and the optical fiber is fixed in the V or U groove by the substrate and the cover. The optical fiber which is fixed in the V or U groove by the substrate and the cover is positioned accurately in the optical waveguide chip. Even though the first optical waveguide and/or the second optical waveguide is an optical fiber, since the cover is disposed over the optical fiber, a light-detecting element for detecting light emitted out of the first optical waveguide and/or the second optical waveguide may be disposed on the cover. Therefore, the light-detecting element may be installed with ease.

According to the present invention, there is also provided an optical component comprising a first optical waveguide chip having a first optical waveguide, first and second end faces at which the first optical waveguide is exposed, and a second optical waveguide chip having a second optical waveguide, third and fourth end faces at which the second optical waveguide is exposed, the second end face being inclined to a direction in which light is propagated through the first optical waveguide, the third end face being inclined to a direction in which light is propagated through the second optical waveguide, the first optical waveguide chip and the second optical waveguide chip being disposed such that the first optical waveguide and the second optical waveguide are optically coupled to each other, the second and third end faces extending substantially parallel to each other with a layer interposed therebetween which has a refractive index that is different from the refractive index of at least one of the first and second optical waveguides, the arrangement being such that a portion of light propagated from the first optical waveguide to the second optical waveguide is reflected out of at least one of the first and second optical waveguide chips by at least one of the second end face of the first optical waveguide chip and the third end face of the second optical waveguide chip, at least one of the first and second optical waveguides comprising an optical fiber, one of the first and second optical waveguide chips which has the optical fiber having a substrate having a V groove of a V-shaped cross section or a U groove of a U-shaped cross section defined therein for placing the optical fiber therein, and a cover for fixing the optical fiber in the V or U groove, the optical fiber being fixed in the V or U groove by the substrate and the cover.

Also with this arrangement, the second end face of the first optical waveguide chip is inclined to the direction of propagation of light through the first optical waveguide, and the third end face of the second optical waveguide chip is inclined to the direction of propagation of light through the second optical waveguide, and the second and third end faces extend substantially parallel to each other with a layer interposed therebetween which has a refractive index that is different from the refractive index of at least one of the first and second optical waveguides. Therefore, a portion of light propagated from the first optical waveguide to the second optical waveguide is reflected out of at least one of the first and second optical waveguide chips by at least one of the second end face of the first optical waveguide chip and the third end face of the second optical waveguide chip.

According to the present invention, the first optical waveguide is disposed in the first optical waveguide chip, and the second optical waveguide is disposed in the second optical waveguide chip, and the first and second optical waveguides are optically coupled to each other and light is emitted from the first optical waveguide chip and/or the second optical waveguide chip by the inclined end faces of the first and second optical waveguide chips. If a plurality of light paths are required, then a plurality of first optical waveguides may be disposed in the first optical waveguide chip, and a plurality of second optical waveguides may be disposed in the second optical waveguide chip. As a result, the optical component may easily be fabricated in an integrated configuration, and reduced in size and cost.

At least one of the first and second optical waveguides comprises an optical fiber, and one of the first and second optical waveguide chips which has the optical fiber has a substrate having a V groove of a V-shaped cross section or a U groove of a U-shaped cross section defined therein for placing the optical fiber therein, and a cover for fixing the optical fiber in the V or U groove, the optical fiber being fixed in the V or U groove by the substrate and the cover. With at least one of the first and second optical waveguides comprising an optical fiber, since it is of the same material as the optical fiber used for transmission, these optical fibers can easily be spliced to each other with a small optical loss. The optical fiber which is fixed in the V or U groove by the substrate and the cover can be positioned accurately in the optical waveguide chip. Even though at least one of the first and second optical waveguides comprises an optical fiber, because the cover is disposed over the optical fiber, a light-detecting element for detecting light emitted from the first optical waveguide chip and the second optical waveguide chip may easily be installed on the cover.

The other of the first and second optical waveguides may comprise an optical waveguide composed of a dielectric substrate with an impurity diffused therein.

With the other of the first and second optical waveguides comprising an optical waveguide composed of a dielectric substrate with an impurity diffused therein, a number of optical waveguides may easily be formed in the dielectric substrate, and may easily be fabricated in an integrated configuration. A light-detecting element or the like may easily be placed on the dielectric substrate even without placing a cover on the dielectric substrate.

According to the present invention, there is further provided an optical component comprising a first optical waveguide chip having a first optical waveguide, first and second end faces at which the first optical waveguide is exposed, and a second optical waveguide chip having a second optical waveguide which has a refractive index different from the refractive index of the first optical waveguide, third and fourth end faces at which the second optical waveguide is exposed, the second end face being inclined to a direction in which light is propagated through the first optical waveguide, the third end face being inclined to a direction in which light is propagated through the second optical waveguide, one of the first and second optical waveguides comprising an optical fiber, one of the first and second optical waveguide chips which has the optical fiber having a substrate having a V groove of a V-shaped cross section or a U groove of a U-shaped cross section defined therein for placing the optical fiber therein, and a cover for fixing the optical fiber in the V or U groove, the optical fiber being fixed in the V or U groove by the substrate and the cover, the other of the first and second optical waveguides comprising an optical waveguide composed of a dielectric substrate with an impurity diffused therein, the first optical waveguide chip and the second optical waveguide chip being disposed such that the second and third end faces extend substantially parallel to each other, and the first optical waveguide exposed at the second end face and the second optical waveguide exposed at the third end face are optically coupled directly to each other, the arrangement being such that a portion of light propagated from the first optical waveguide to the second optical waveguide is reflected out of at least one of the first and second optical waveguide chips by at least one of the second end face of the first optical waveguide chip and the third end face of the second optical waveguide chip.

With this structure, one of the first and second optical waveguides comprises an optical fiber and the other of the first and second optical waveguides comprises an optical waveguide composed of a dielectric substrate with an impurity diffused therein, the first and second optical waveguides having different refractive indexes. Even though the first and second optical waveguides are positioned relative to each other such that the first and second optical waveguides which are exposed at the second and third end faces, respectively, are held in direct contact with each other and optically coupled to each other, a portion of light propagated from the first optical waveguide to the second optical waveguide is reflected out of at least one of the first and second optical waveguide chips. Consequently, the first and second optical waveguide chips can easily be positioned relatively to each other.

Preferably, the dielectric substrate is made of LiNbO$_3$, LiTaO$_3$, glass, or a semiconductor.

Preferably, the layer which is interposed between the second and third end faces and has a refractive index that is different from the refractive index of at least one of the first and second optical waveguides, is made of air, a dielectric, or metal.

If the layer interposed between the second and third end faces is an air layer, the layer should preferably have a thickness in the range of from 0.5 to 10 μm. If the thickness of the layer were smaller than 0.5 μm, then a portion of light propagated from the first optical waveguide to the second optical waveguide would not be practically sufficiently reflected by at least one of the second end face of the first optical waveguide chip and the third end face of the second optical waveguide chip. If the thickness of the layer were greater than 10 μm, then the intensity of light propagated from the first optical waveguide to the second optical waveguide would be too low.

Preferably, the layer is made of a dielectric or metal. With the dielectric or metal layer interposed between the second and third end faces, the first optical waveguide exposed at the second end face and the second optical waveguide exposed at the third end face can be held in direct contact respectively with opposite surfaces of the layer.

Consequently, the distance between the first and second optical waveguides exposed at the second and third end faces is determined highly accurately, and hence it is possible to determine with accuracy an intensity of light which is transmitted from the first optical waveguide to the second optical waveguide and an intensity of light which is emitted out of at least one of the first and second optical waveguide chips.

Since the dielectric or metal layer is interposed between the second and third end faces, the intensity of light which is transmitted from the first optical waveguide to the second optical waveguide and the intensity of light which is emitted out of at least one of the first and second optical waveguide chips can easily be controlled by selecting a material of the dielectric or metal layer.

The optical component may further comprise a light-detecting element for detecting the light which is reflected out of at least one of the first and second optical waveguide chips by at least one of the second end face and the third end face.

If the first optical waveguide comprises an optical fiber and the optical component which includes the light-detecting element has a cover for fixing the optical fiber in the V or U groove, then the cover is preferably made of a material which passes light propagated through the optical fiber, the light-detecting element being fixed to the cover.

The optical component may further comprise a light source for introducing light into the second optical waveguide.

Moreover, the optical component may further comprise optical coupling means for optically coupling the light from the light source to the second optical waveguide which is exposed at the fourth end face.

Each of the first and second optical waveguides may comprise a plurality of parallel optical waveguides. The optical component can thus be fabricated in a highly integrated configuration.

The angle formed between the second end face of the first optical waveguide and the direction of propagation of light through the first optical waveguide, and the angle formed between the third end face of the second optical waveguide and the direction of propagation of light through the second optical waveguide should preferably be 80° or less. If these angles were greater than 80°, then the angle of reflection would be too small, and the distance between the reflecting surfaces and the light-detecting element would be too large, resulting in a widely spread light beam and a reduced intensity of detected light.

The angle formed between the second end face of the first optical waveguide and the direction of propagation of light through the first optical waveguide, and the angle formed between the third end face of the second optical waveguide and the direction of propagation of light through the second optical waveguide should more preferably be the Brewster's angle or less. The angle of incidence ranging between the Brewster's angle and the critical angle allows the reflectivity to be large.

However, the angle formed between the second end face of the first optical waveguide and the direction of propagation of light through the first optical waveguide, and the angle formed between the third end face of the second optical waveguide and the direction of propagation of light through the second optical waveguide should be (90°—critical angle) or more.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 4:
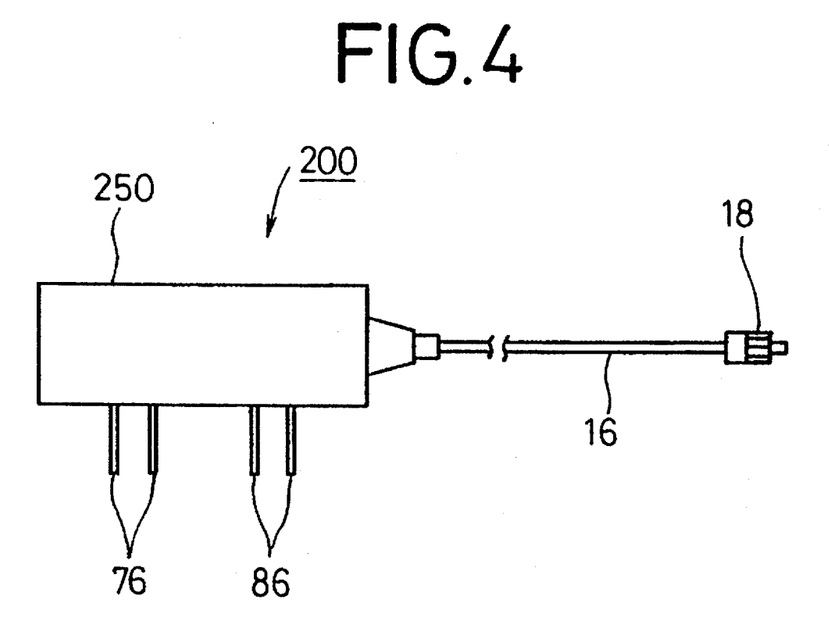
FIG. 4 is a side elevational view of the optical component according to the first embodiment of the present invention.

As shown in FIG. 4, an optical reception/transmission module 200 according to a first embodiment of the present invention has a package 250 with a single-mode optical fiber 16 extending from one end thereof. An optical connector 18 such as an FC connector is connected to a distal end of the optical fiber 16 remote from the package 250.

Figure 3:
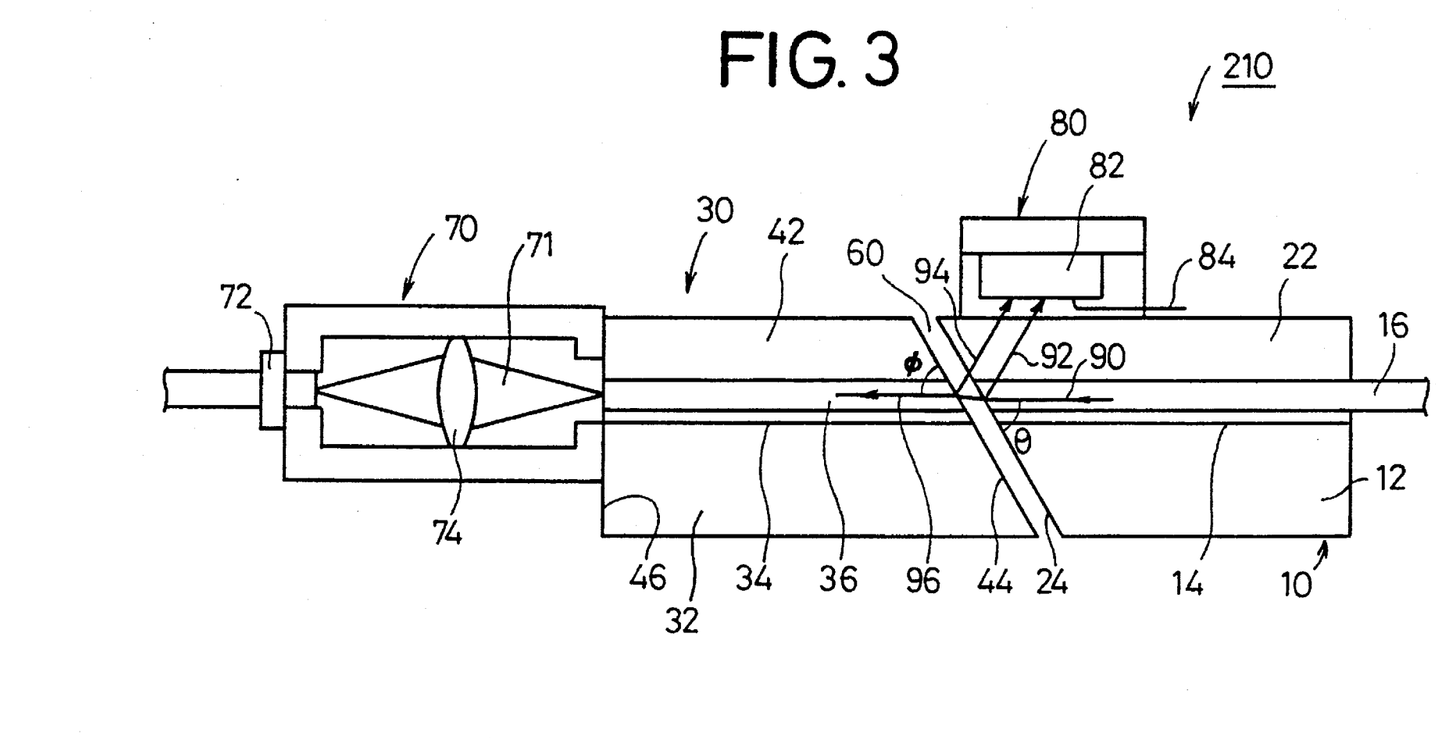
FIG. 3 is a cross-sectional view of the optical component according to the first embodiment of the present invention.

As shown in FIG. 3, the package 250 houses a component assembly 210 therein. The component assembly 210 comprises a first optical waveguide chip 10, a second optical waveguide chip 30, a photodiode module 80 mounted on the first optical waveguide chip 10, and a laser diode module 70 mounted on an end face 46 of the second optical waveguide chip 30.

The photodiode module 80 has a photodiode 82 disposed therein. The laser diode module 70 includes a laser diode 72 and a lens 74 for converging a laser beam 71 emitted from the laser diode 72 onto an optical fiber 36.

Figure 2:
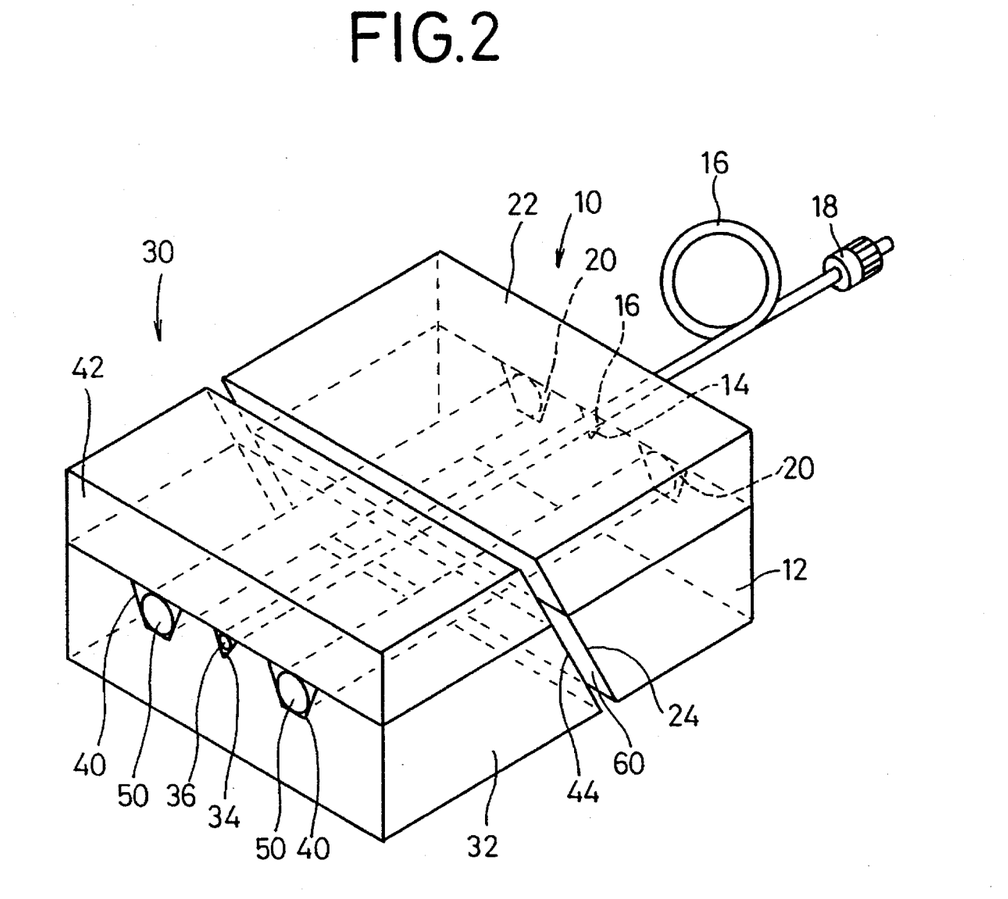
FIG. 2 is a perspective view of an optical component according to a first embodiment of the present invention.

As shown in FIGS. 2 and 3, the first optical waveguide chip 10 comprises a ceramic substrate 12 and a cover 22 of quartz. The ceramic substrate 12 has a V groove 14 having a V-shaped cross section for placing the optical fiber 16 therein and a pair of guide grooves 20, the V groove 14 and the guide grooves 20 being defined in an upper surface of the ceramic substrate 12. The optical fiber 16 has an end portion fixedly disposed in the V groove 14 by the ceramic substrate 12 and the cover 22. The optical connector 18 is joined to the opposite distal end of the optical fiber 16. The photodiode module 80 is fixedly mounted on an upper surface of the cover 22.

The second optical waveguide chip 30 comprises a ceramic substrate 32 and a cover 42. The ceramic substrate 32 has a V groove 34 having a V-shaped cross section for placing a single-mode optical fiber 36 therein and a pair of guide grooves 40, the V groove 34 and the guide grooves 40 being defined in an upper surface of the ceramic substrate 32. The optical fiber 36 is fixedly disposed in the V groove 34 by the ceramic substrate 32 and the cover 42. The end face 46 of the second optical waveguide chip 30 is polished to an optical finish such that it lies at 90° with respect to the direction in which light 96 is propagated through the optical fiber 36. The laser diode module 70 is attached to the end face 46. The V grooves 14, 34 may be replaced with U grooves each having a U-shaped cross section.

The first optical waveguide chip 10 has an end face 24 polished to an optical finish such that it is inclined at θ=62° with respect to the direction in which light 99 is propagated through the optical fiber 16. The second optical waveguide chip 30 has an end face 44 polished to an optical finish such that it is inclined at θ=62° with respect to the direction in which light 96 is propagated through the optical fiber 36. Guide pins 50 are intimately inserted in the guide grooves 20, 40, thereby positioning the first optical waveguide chip 10 and the second optical waveguide chip 30 relatively to each other.

The end faces 24, 44 of the first and second optical waveguide chips 10, 30 extend substantially parallel to each other with an air layer 60 interposed therebetween, the air layer 60 having a thickness of about 5 µm. With such an arrangement, the optical fibers 16, 36 are optically coupled to each other, and a portion of light propagated from the optical fiber 16 to the optical fiber 36 is reflected into the photodiode 82 by the end faces 24, 44.

A method of fabricating the optical reception/transmission module 200 according to the first embodiment of the present invention will be described below.

As shown in FIGS. 2 and 3, a ceramic substrate 12 having a length of 5 mm, a width of 5 mm, and a thickness of 3 mm is prepared, and a V groove 14 having a V-shaped cross section is defined centrally in the ceramic substrate 12 for accommodating a single-mode optical fiber 16 which has a diameter of 125 µm, and two guide grooves 20 are defined in the ceramic substrate 12 one on each side of the V groove 14 for accommodating respective rod-shaped guide pins 50 each having a diameter of 700 µm.

Then, an end portion of the optical fiber 16, which is 125 µm across and 2 m long, is placed in the V groove 14, with the optical connector 18 connected to the other end of the optical fiber 16.

Thereafter, a cover 22 of quartz having a thickness of 0.3 mm is placed on the ceramic substrate 12 over the optical fiber 16, and the ceramic substrate 12, the optical fiber 16, and the cover 22 are joined to each other by a resin adhesive.

The ceramic substrate 12, the optical fiber 16, and the cover 22 which are thus bonded jointly have an end face 24 cut and polished to an optical finish such that the end face 24 is inclined at θ=62° with respect to the direction in which light 90 is propagated through the optical fiber 16. In this manner, the first optical waveguide chip 10 is produced.

A ceramic substrate 32 having a length of 5 mm, a width of 5 mm, and a thickness of 3 mm is prepared, and a V groove 34 having a V-shaped cross section is defined centrally in the ceramic substrate 32 for accommodating a single-mode optical fiber 36 which has a diameter of 125 µm, and two guide grooves 40 are defined in the ceramic substrate 32 one on each side of the V groove 34 for accommodating the respective rod-shaped guide pins 50.

Then, the optical fiber 36, which is 125 µm across and 5 mm long, is placed in the V groove 34.

Thereafter, a cover 42 having a thickness of 0.3 mm is placed on the ceramic substrate 32 over the optical fiber 36, and the ceramic substrate 32, the optical fiber 36, and the cover 42 are joined to each other by a resin adhesive.

The ceramic substrate 32, the optical fiber 36, and the cover 42 which are thus bonded jointly have an end face 44 cut and polished to an optical finish such that the end face 44 is inclined at θ=62° with respect to the direction in which light 96 is propagated through the optical fiber 36. In this manner, the second optical waveguide chip 30 is produced.

Thereafter, a photodiode 82 is disposed above the first optical waveguide chip 10. Specifically, a photodiode module 80 is directly placed on and fixed to the upper surface of the cover 22, and the photodiode 82 in the photodiode module 80 is spaced 0.2 mm from the cover 22.

A laser diode module 70 which has a laser diode 72 and a lens 74 is attached to the end face 46 of the second optical waveguide chip 30 such that a laser beam 71 emitted from the laser diode 72 will be converged onto the optical fiber 36.

Guide pins 50 are inserted into the guide grooves 20 of the first optical waveguide chip 10 and the guide grooves 40 of the second optical waveguide chip 30 for aligning the optical axes of the optical fibers 16, 36 with each other. The end face 24 of the first optical waveguide chip 10 and the end face 44 of the second optical waveguide chip 30 are positioned parallel to each other such that the air layer 60 between the end faces 24, 44 has a thickness of about 5 μm. Then, a molten resin material is introduced into the guide grooves 20, 40, thereby integrally joining the first optical waveguide chip 10, the second optical waveguide chip 30, and the guide pins 50. In this manner, the component assembly 210 is produced.

Then, as shown in FIG. 4, the component assembly 210 is housed in a package 250, thereby completing the optical reception/transmission module 200. Leads 76 attached to the package 250 are electrically connected to the laser diode 72, and leads 86 attached to the package 250 are electrically connected to the photodiode 82. The leads 86 are connected to leads 84 (see FIG. 3).

The optical reception/transmission module 200 was measured for its characteristics. The light which was transmitted from the optical fiber 16 to the optical fiber 36 was about 60% of the light propagated through the optical fiber 16, and the light reflected as light 92, 94 by the end faces 24, 44 and having reached the photodiode 82 was about 5% of the light propagated through the optical fiber 16.

Figure 5:
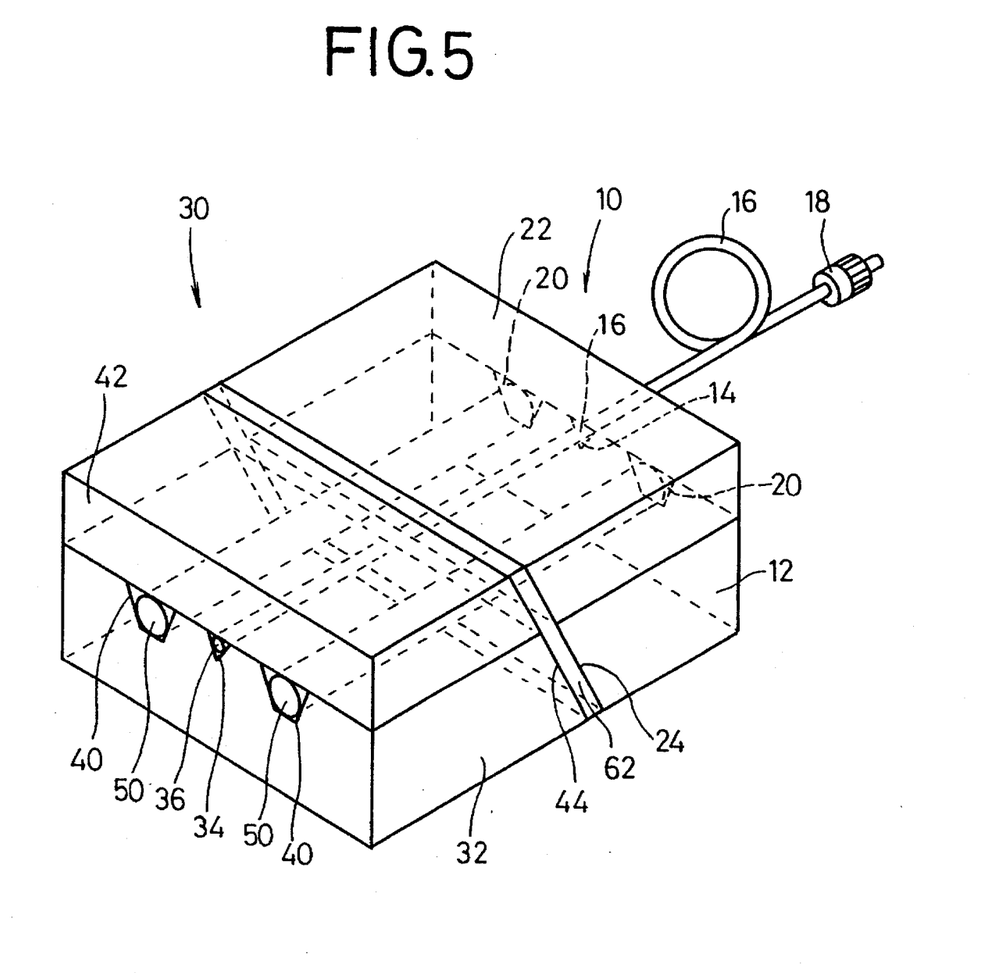
FIG. 5 is a perspective view of an optical component according to a second embodiment of the present invention.
Figure 6:
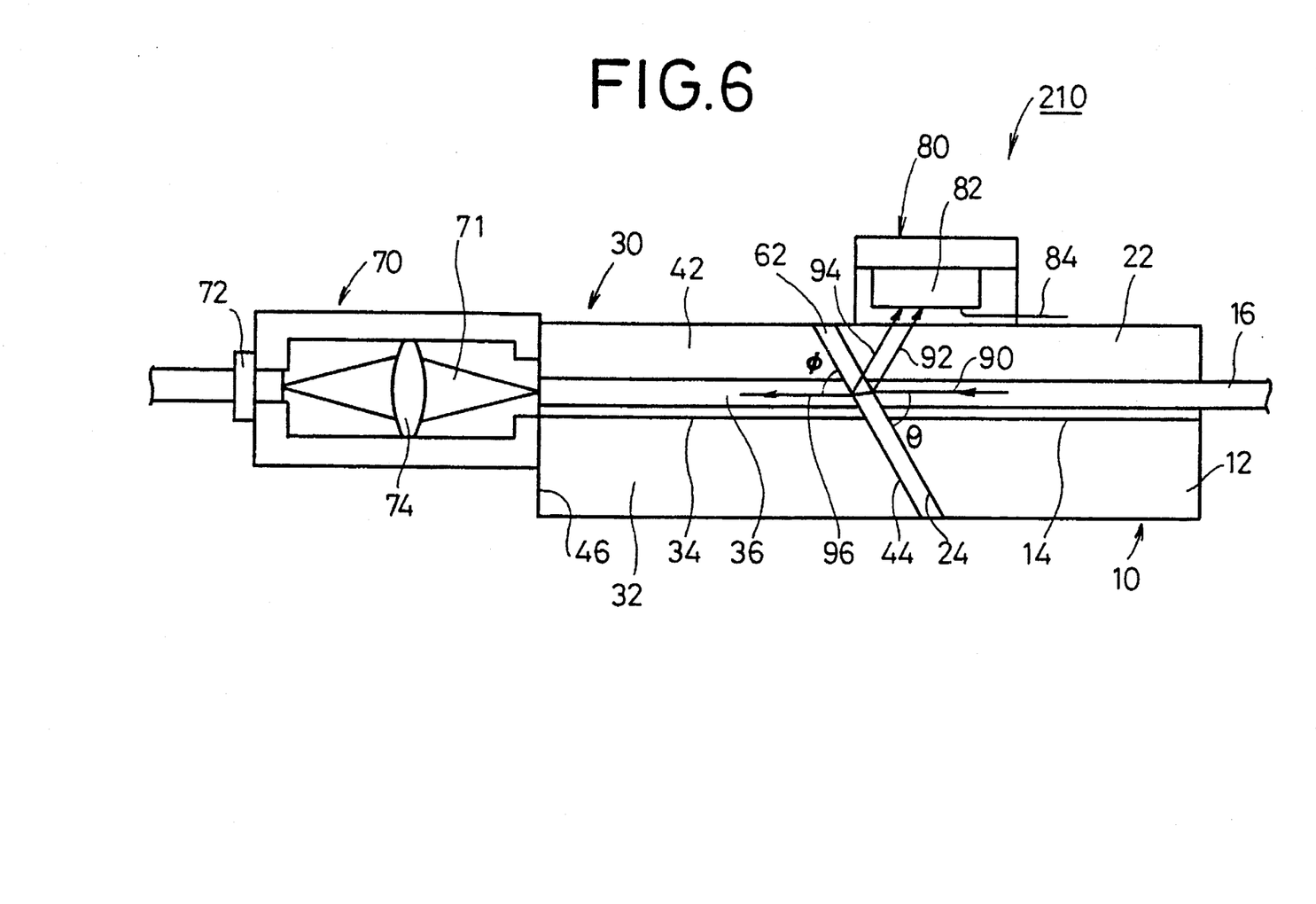
FIG. 6 is a cross-sectional view of the optical component according to the second embodiment of the present invention.

FIGS. 5 and 6 illustrate an optical component according to a second embodiment of the present invention.

An optical reception/transmission module 200 according to the second embodiment of the present invention differs from the optical reception/transmission module 200 according to the first embodiment in that a titanium (Ti) film 62 is disposed on the end face 44 of the second optical waveguide chip 30 and held in contact with the end face 24 of the first optical waveguide chip 10. The other structural details of the optical reception/transmission module 200 shown in FIGS. 5 and 6 are the same as those of the optical reception/transmission module 200 shown in FIGS. 2 and 3.

A method of fabricating the optical reception/transmission module 200 according to the second embodiment of the present invention will be described below.

As shown in FIGS. 5 and 6, a ceramic substrate 12 having a length of 5 mm, a width of 5 mm, and a thickness of 3 mm is prepared, and a V groove 14 having a V-shaped cross section is defined centrally in the ceramic substrate 12 for accommodating a single-mode optical fiber 16 which has a diameter of 125 μm, and two guide grooves 20 are defined in the ceramic substrate 12 one on each side of the V groove 14 for accommodating respective rod-shaped guide pins 50 each having a diameter of 700 μm.

Then, an end portion of the optical fiber 16, which is 125 μm across and 2 m long, is placed in the V groove 14, with the optical connector 18 connected to the other end of the optical fiber 16.

Thereafter, a cover 22 having a thickness of 0.3 mm is placed on the ceramic substrate 12 over the optical fiber 16, and the ceramic substrate 12, the optical fiber 16, and the cover 22 are joined to each other by a resin adhesive.

The ceramic substrate 12, the optical fiber 16, and the cover 22 which are thus bonded jointly have an end face 24 cut and polished to an optical finish such that the end face 24 is inclined at θ=62° with respect to the direction in which light 90 is propagated through the optical fiber 16. In this manner, the first optical waveguide chip 10 is produced.

A ceramic substrate 32 having a length of 5 mm, a width of 5 mm, and a thickness of 3 mm is prepared, and a V groove 34 having a V-shaped cross section is defined centrally in the ceramic substrate 32 for accommodating a single-mode optical fiber 36 which has a diameter of 125 μm, and two guide grooves 40 are defined in the ceramic substrate 32 one on each side of the V groove 34 for accommodating the respective rod-shaped guide pins 50.

Then, the optical fiber 36, which is 125 μm across and 5 mm long, is placed in the V groove 34.

Thereafter, a cover 42 having a thickness of 0.3 mm is placed on the ceramic substrate 32 over the optical fiber 36, and the ceramic substrate 32, the optical fiber 36, and the cover 42 are joined to each other by a resin adhesive.

The ceramic substrate 32, the optical fiber 36, and the cover 42 which are thus bonded jointly have an end face 44 cut and polished to an optical finish such that the end face 44 is inclined at θ=62° with respect to the direction in which light 96 is propagated through the optical fiber 36. Thereafter, a Ti film 62 having a thickness of 300 Å is disposed on the inclined end face 44. An opposite end face 46 is polished to an optical finish such that it lies at 90° with respect to the direction in which the light 96 is propagated through the optical fiber 36. In this manner, the second optical waveguide chip 30 is produced.

Thereafter, a photodiode 82 is disposed above the first optical waveguide chip 10. Specifically, a photodiode module 80 is directly placed on and fixed to the upper surface of the cover 22, and the photodiode 82 in the photodiode module 80 is spaced 0.2 mm from the cover 22.

A laser diode module 70 which has a laser diode 72 and a lens 74 is attached to the end face 46 of the second optical waveguide chip 30 such that a laser beam 71 emitted from the laser diode 72 will be converged onto the optical fiber 36.

Guide pins 50 are inserted into the guide grooves 20 of the first optical waveguide chip 10 and the guide grooves 40 of the second optical waveguide chip 30 for aligning the optical axes of the optical fibers 16, 36 with each other. The end face 24 of the first optical waveguide chip 10 and the Ti film 62 on the end face 44 of the second optical waveguide chip 30 are held in abutment against each other. Then, a molten resin material is introduced into the guide grooves 20, 40, thereby integrally joining the first optical waveguide chip 10, the second optical waveguide chip 30, and the guide pins 50. In this manner, the component assembly 210 is produced.

Then, as shown in FIG. 4, the component assembly 210 is housed in a package 250, thereby completing the optical reception/transmission module 200. Leads 76 attached to the package 250 are electrically connected to the laser diode 72, and leads 86 attached to the package 250 are electrically connected to the photodiode 82. The leads 86 are connected to leads 84 (see FIG. 3).

The optical reception/transmission module 200 shown in FIGS. 5 and 6 was measured for its characteristics. The light which was transmitted from the optical fiber 16 to the optical fiber 36 was about 50% of the light propagated through the optical fiber 16, and the light reflected as light 92, 94 by the end faces 24, 44 and having reached the photodiode 82 was about 10% of the light propagated through the optical fiber 16.

In the optical reception/transmission module 200 shown in FIGS. 5 and 6, the end faces 24, 44 are positioned in sandwiching relation to the Ti film 62 and held in contract with the Ti film 62. Therefore, any irregularities of the distance between the end faces 24, 44 are minimized, and hence characteristic variations of the optical reception/transmission module 200 are also minimized.

Figure 7:
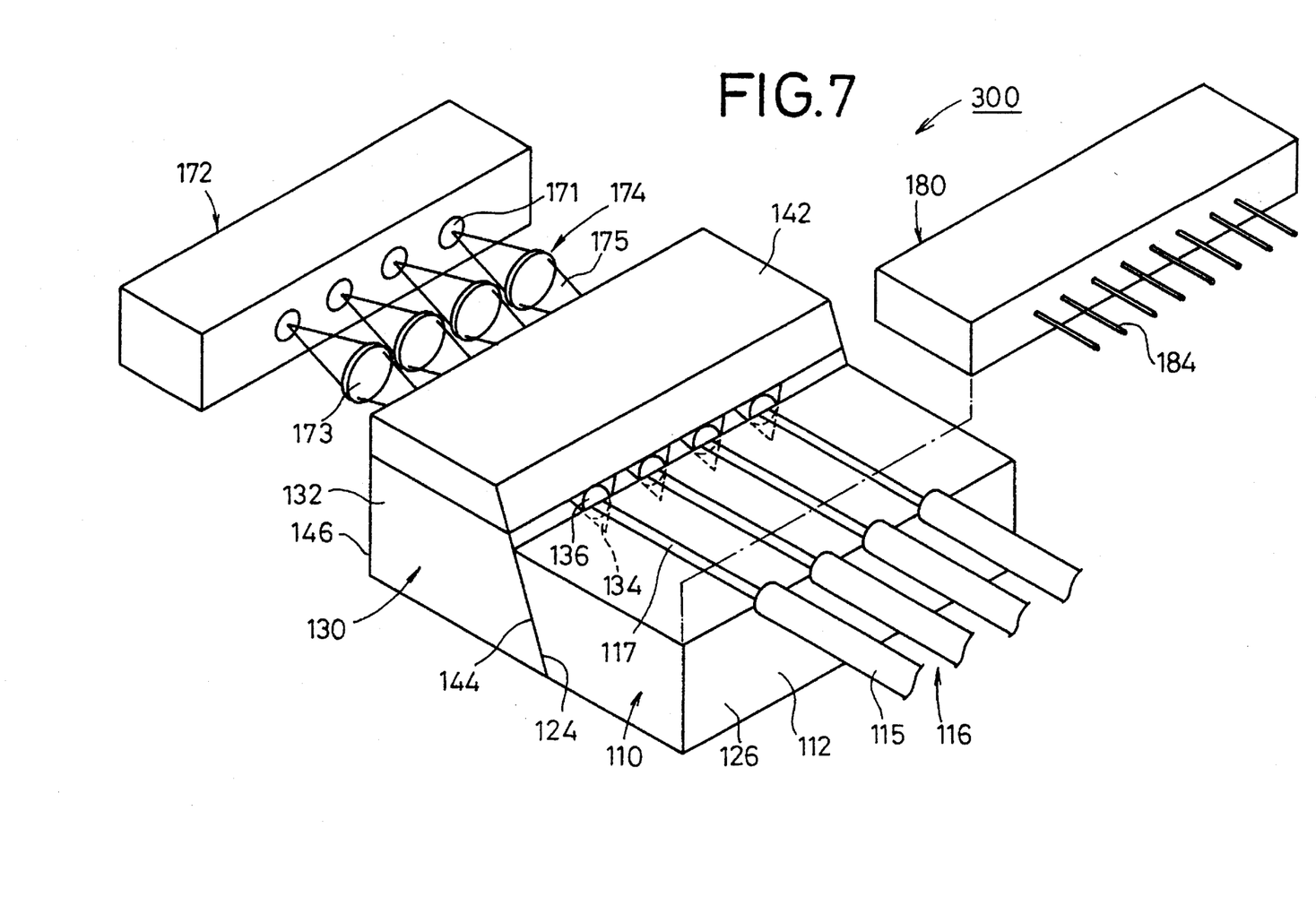
FIG. 7 is a perspective view of an optical component according to a third embodiment of the present invention.

FIG. 7 illustrates an optical reception/transmission module 300 according to a third embodiment of the present invention.

As shown in FIG. 7, an optical reception/transmission module 300 comprises a first optical waveguide chip 110, a second optical waveguide chip 130, a photodiode array 180 mounted on the first optical waveguide chip 110, a laser diode array 172 spaced from the second optical waveguide chip 30, and a lens array 174 disposed between the laser diode array 172 and the second optical waveguide chip 130.

The laser diode array 172 comprises four laser diodes 171, and the lens array 174 comprises four lenses 173. Laser beams 175 emitted from the four laser diodes 171 are converged onto four single-mode optical fibers 136, respectively, by the four lenses 173. The photodiode array 180 comprises four photodiodes (not shown), and eight leads 184 extend from the photodiode array 180.

The first optical waveguide chip 110 has a substrate 112 of LiNbO$_3$. Four Ti-diffused optical waveguides 117 are formed at a pitch or spacing of 5 mm on an upper surface of the substrate 112 of LiNbO$_3$. The substrate 112 of LiNbO$_3$ has an end face 126 polished to an optical finish such that it lies at 90° with respect to the direction in which light is propagated through the Ti-diffused optical waveguides 117. An optical fiber array 116 is composed of four optical fibers 115 whose respective ends are aligned with and secured to the Ti-diffused optical waveguides 117, respectively. Optical connectors (not shown) are connected respectively to the other end of the optical fiber array 116. The photodiode array 180 is fixedly mounted on an upper surface of the substrate 112 of LiNbO$_3$.

The substrate 112 may be made of LiTaO$_3$, glass, or a semiconductor.

The second optical waveguide chip 130 has a ceramic substrate 132, a cover 142, and four optical fibers 136. The ceramic substrate 132 has V grooves 134 each having a V-shaped cross section for placing the respective optical fibers 136 therein, the V grooves 134 being defined in an upper surface of the ceramic substrate 132. The optical fibers 136 are disposed in the respective V grooves 134, and held in position by the ceramic substrate 132 and the cover 142. The second optical waveguide chip 130 has an end face 146 polished to an optical finish such that it lies at 90° with respect to the direction in which light is propagated through the optical fibers 136.

The first optical waveguide chip 110 has an end face 124 polished to an optical finish such that it is inclined at 62° to the direction in which light is propagated through the Ti-diffused optical waveguides 117. The second optical waveguide chip 130 has an end face 144 polished to an optical finish such that it is inclined at 62° to the direction in which light is propagated through the optical fibers 136.

The end face 124 of the first optical waveguide chip 110 and the end face 144 of the second optical waveguide chip 130 are held in direct contact with each other. With such an arrangement, the Ti-diffused optical waveguides 117 and the optical fibers 136 are directly held against, and optically coupled to, each other, and a portion of light propagated from the Ti-diffused optical waveguides 117 to the optical fibers 136 is reflected into the photodiodes of the photodiode array 180 by the end faces 124, 144.

A method of fabricating an optical reception/transmission module 300 according to the third embodiment of the present invention will be described below.

Four Ti films (not shown) each having a width of 8 μm and a thickness of 300 Å are formed at a pitch or spacing of 5 mm on an upper surface of a substrate 112 of LiNbO$_3$ having a thickness of 1 mm. Thereafter, the Ti films are kept at a temperature of about 1000° C. for 6 hours, thereby producing four Ti-diffused optical waveguides 117 at a pitch or spacing of 5 mm.

Then, an end face 126 of the substrate 112 of LiNbO$_3$ is polished to an optical finish such that it lies at 90° with respect to the direction in which light is propagated through the Ti-diffused optical waveguides 117 (with respect to the upper surface of the substrate 112 of LiNbO$_3$ in this embodiment), and an end face 124 of the substrate 112 of LiNbO$_3$ is polished to an optical finish such that it is inclined at 62° to the direction in which light is propagated through the Ti-diffused optical waveguides 117 (to the upper surface of the substrate 112 of LiNbO$_3$ in this embodiment). In this manner, the first optical waveguide chip 110 is produced.

Then, a photodiode array 180 is placed on and fixed to the upper surface of the substrate 112 of LiNbO$_3$.

An optical fiber array 116 composed of four optical fibers 115 and having an end connected to optical connectors (not shown) is prepared. The other end of the optical fiber array 116 is optically adjusted and fixed to the end face 126 of the substrate 112 of LiNbO$_3$.

A ceramic substrate 132 having a length of 5 mm, a width of 5 mm, and a thickness of 3 mm is prepared, and four V grooves 134 each having a V-shaped cross section are defined centrally in the ceramic substrate 132 for accommodating four single-mode optical fibers 136 each having a diameter of 125 μm.

Then, the four optical fibers 136, which are 125 μm across and 5 mm long, are placed respectively in the V grooves 134.

Thereafter, a cover 142 having a thickness of 0.3 mm is placed on the ceramic substrate 132 over the optical fibers 136, and the ceramic substrate 132, the optical fibers 136, and the cover 142 are joined to each other by a resin adhesive.

The ceramic substrate 132, the optical fibers 136, and the cover 142 which are thus bonded jointly have an end face 144 cut and polished to an optical finish such that the end face 144 is inclined at 62° with respect to the direction in which light is propagated through the optical fibers 136. An opposite end 146 thereof is polished to an optical finish such that it lies at 90° with respect to the direction in which light is propagated through the optical fibers 136. In this manner, the second optical waveguide chip 130 is produced.

A laser diode array 172 and a lens array 174 are positioned on the side of the end face 146 such that four laser beams 175 emitted from the respective laser diodes 171 will be converged onto the respective optical fibers 136 by the respective lenses 173.

The laser diodes 171 are energized to emit laser beams. While the intensities of the emitted laser beams are being measured by the photodiode array 180, the optical axes of the optical fibers 136 and the Ti-diffused optical waveguides 117 are adjusted into alignment, and thereafter the first optical waveguide chip 110 and the second optical waveguide chip 130 are fixed to each other. In this manner, the optical reception/transmission module 300 is produced.

Then, as shown in FIG. 4, the optical reception/transmission module 300 is housed in a package 250, thereby completing the optical reception/transmission module 200. Leads 76 attached to the package 250 are electrically connected to the laser diode array 172, and leads 86 attached to the package 250 are electrically connected to the photodiode array 180. The leads 86 are connected to the leads 184 (see FIG. 7).

The present invention offers the following advantages:

With the above arrangement, an end face of the first optical waveguide chip is inclined to the direction of propagation of light through the first optical waveguide, and an end face of the second optical waveguide chip is inclined to the direction of propagation of light through the second optical waveguide, and these inclined end faces extend substantially parallel to each other with a layer interposed therebetween which has a refractive index that is different from the refractive index of at least one of the first and second optical waveguides. Therefore, a portion of light propagated from the first optical waveguide to the second optical waveguide is reflected out of at least one of the first and second optical waveguide chips by at least one of the end face of the first optical waveguide chip and the end face of the second optical waveguide chip. The optical component thus constructed has a length smaller than a conventional optical component which is composed of two optical fibers fused to each other.

The first optical waveguide is disposed in the first optical waveguide chip, and the second optical waveguide chip is disposed in the second optical waveguide chip, and the first and second optical waveguides are optically coupled to each other and light is emitted from the first optical waveguide chip and/or the second optical waveguide. chip by the inclined end faces of the first and second optical waveguide chips. If a plurality of light paths are required, then a plurality of first optical waveguides may be disposed in the first optical waveguide chip, and a plurality of second optical waveguides may be disposed in the second optical waveguide chip. As a result, the optical component may easily be fabricated in an integrated configuration, and reduced in size and cost.

The first and second guide grooves are defined in the first and second optical waveguide chips, respectively, and the first and second optical waveguide chips are optically coupled to each other with reference to the pins intimately held in the first and second guide grooves. Therefore, the first and second optical waveguides can easily be positioned relatively to each other.

In the case where the first optical waveguide and/or the second optical waveguide comprises an optical fiber, since the optical fiber is of the same material as the optical fiber used for transmission, these optical fibers can easily be spliced to each other with a small optical loss.

The first and/or second optical waveguide chip has a substrate having a V groove of a V-shaped cross section or a U groove of a U-shaped cross section defined therein for placing the optical fiber therein, the optical fiber being fixed in the V or U groove. The optical fiber is thus accurately positioned in the optical waveguide chip.

The first and/or second optical waveguide chip also has a cover for fixing the optical fiber in the V or U groove, the optical fiber being fixed in the V or U groove by the substrate and the cover. The optical fiber can thus be positioned accurately in the optical waveguide chip.

Even though the first optical waveguide and/or the second optical waveguide is an optical fiber, since the cover is disposed over the optical fiber, a light-detecting element for detecting light emitted out of the first optical waveguide and/or the second optical waveguide may be disposed on the cover. Therefore, the light-detecting element may be installed with ease.

In the case where either one of the first and second optical waveguides comprises an optical waveguide composed of a dielectric substrate with an impurity diffused therein, a number of optical waveguides may easily be formed in the dielectric substrate, and may easily be fabricated in an integrated configuration. A light-detecting element or the like may easily be placed on the dielectric substrate even without placing a cover on the dielectric substrate.

One of the first and second optical waveguides may comprise an optical fiber and the other of the first and second optical waveguides may comprise an optical waveguide composed of a dielectric substrate with an impurity diffused therein. With such an arrangement, since the first and second optical waveguides have different refractive indexes, even though the first and second optical waveguides are positioned relatively to each other such that the first and second optical waveguides which are exposed at the inclined end faces, respectively, are held in direct contact with each other and optically coupled to each other, a portion of light propagated from the first optical waveguide to the second optical waveguide is reflected out of at least one of the first and second optical waveguide chips. Consequently, the first and second optical waveguide chips can easily be positioned relatively to each other.

Preferably, the layer which is interposed between the inclined end faces and has a refractive index different from the refractive index of at least one of the first and second optical waveguides is made of a dielectric or metal. The first and second optical waveguides exposed at the respective inclined end faces can be held in direct contact respectively with opposite surfaces of the layer. Consequently, the distance between the first and second optical waveguides exposed at the inclined end faces is determined highly accurately, and hence it is possible to determine with accuracy an intensity of light which is transmitted from the first optical waveguide to the second optical waveguide and an intensity of light which is emitted out of at least one of the first and second optical waveguide chips.

Since the dielectric or metal layer is interposed between the inclined end faces, the intensity of light which is transmitted from the first optical waveguide to the second optical waveguide and the intensity of light which is emitted out of at least one of the first and second optical waveguide chips can easily be controlled by selecting a material of the dielectric or metal layer.

Each of the first and second optical waveguides may comprise a plurality of parallel optical waveguides. The optical component can thus be fabricated in a highly integrated configuration.

Although certain preferred embodiments of the present invention has been shown and described in detail, it should be understood that various changes and modifications may be made therein without departing from the scope of the appended claims.

What is claimed is:

1. An optical component comprising:
    a first optical waveguide chip having a first optical waveguide, first and second end faces at which said first optical waveguide is exposed, and a first guide groove; and
    a second optical waveguide chip having a second optical waveguide, third and fourth end faces at which said second optical waveguide is exposed, and a second guide groove;
    said second end face being inclined to a direction in which light is propagated through said first optical waveguide;
    said third end face being inclined to a direction in which light is propagated through said second optical waveguide;
    said first optical waveguide of said first optical waveguide chip and said second optical waveguide of said second optical waveguide chip being optically coupled to each other with reference to pins intimately placed in said first and second guide grooves;
    said second and third end faces extending substantially parallel to each other with a layer interposed therebetween which has a refractive index that is different from the refractive index of at least one of said first and second optical waveguides;
    the arrangement being such that a portion of light propagated from said first optical waveguide to said second optical waveguide is reflected out of at least one of the first and second optical waveguide chips by at least one of said second end face of said first optical waveguide chip and said third end face of said second optical waveguide chip, the reflected light propagating through a light transmissive portion of at least one of said optical waveguide chips.

2. An optical component according to claim 1, wherein each of said first and second optical waveguides comprises an optical fiber, each of said first and second optical waveguide chips having a substrate having a V groove of a V-shaped cross section or a U groove of a U-shaped cross section defined therein for placing the optical fiber therein, said optical fiber being fixed in the V or U groove.

3. An optical component according to claim 2, wherein each of said first and second optical waveguide chips has a cover for fixing the optical fiber in the V or U groove, said optical fiber being fixed in the V or U groove by said substrate and said cover.

4. An optical component according to claim 3, further comprising a light-detecting element for detecting the light which is reflected out of at least one of the first and second optical waveguide chips by at least one of said second end face and said third end face, said first optical waveguide comprising an optical fiber, said cover being made of a material which passes light propagated through said optical fiber, said light-detecting element being fixed to said cover.

5. An optical component according to claim 1, further comprising a light-detecting element for detecting the light which is reflected out of at least one of the first and second optical waveguide chips by at least one of said second end face and said third end face.

6. An optical component according to claim 1, wherein said layer is made of air, a dielectric, or metal.

7. An optical component according to claim 1, further comprising a light source for introducing light into said second optical waveguide, and optical coupling means for optically coupling the light from said light source to said second optical waveguide which is exposed at said fourth end face.

8. An optical component according to claim 1, wherein each of said first and second optical waveguides comprises a plurality of parallel optical waveguides.

9. An optical component comprising:
    a first optical waveguide chip having a first optical waveguide and first and second end faces at which said first optical waveguide is exposed; and
    a second optical waveguide chip having a second optical waveguide and third and fourth end faces at which said second optical waveguide is exposed;
    said second end face being inclined to a direction in which light is propagated through said first optical waveguide;
    said third end face being inclined to a direction in which light is propagated through said second optical waveguide;
    said first optical waveguide chip and said second optical waveguide chip being disposed such that said first optical waveguide and said second optical waveguide are optically coupled to each other;
    said second and third end faces extending substantially parallel to each other with a layer interposed therebetween which has a refractive index that is different from the refractive index of at least one of said first and second optical waveguides;
    the arrangement being such that a portion of light propagated from said first optical waveguide to said second optical waveguide is reflected out of at least one of the first and second optical waveguide chips by at least one of said second end face of said first optical waveguide chip and said third end face of said second optical waveguide chip, the reflected light propagating through a light transmissive portion of at least one of said optical waveguide chips;
    at least one of said first and second optical waveguides comprising an optical fiber;
    one of said first and second optical waveguide chips which has said optical fiber having a substrate having a V groove of a V-shaped cross section or a U groove of a U-shaped cross section defined therein for placing the optical fiber therein, and a cover for fixing said optical fiber in the V or U groove;
    said optical fiber being fixed in said V or U groove by said substrate and said cover.

10. An optical component according to claim 9, wherein the other of said first and second optical waveguides comprises an optical waveguide composed of a dielectric substrate with an impurity diffused therein.

11. An optical component according to claim 10, wherein said dielectric substrate is made of $LiNbO_3$, $LiTaO_3$, glass, or a semiconductor.

12. An optical component according to claim 9, wherein said layer is made of air, a dielectric, or metal.

13. An optical component according to claim 9, further comprising a light-detecting element for detecting the light which is reflected out of at least one of the first and second optical waveguide chips by at least one of said second end face and said third end face.

14. An optical component according to claim 9, further comprising a light-detecting element for detecting the light which is reflected out of at least one of the first and second optical waveguide chips by at least one of said second end face and said third end face, said first optical waveguide comprising an optical fiber, said cover being made of a material which passes light propagated through said optical fiber, said light-detecting element being fixed to said cover.

15. An optical component according to claim 9, further comprising a light source for introducing light into said second optical waveguide, and optical coupling means for optically coupling the light from said light source to said second optical waveguide which is exposed at said fourth end face.

16. An optical component according to 9, wherein each of said first and second optical waveguides comprises a plurality of parallel optical waveguides.

17. An optical component comprising:

a first optical waveguide chip having a first optical waveguide, first and second end faces at which said first optical waveguide is exposed; and a second optical waveguide chip having a second optical waveguide which has a refractive index different from the refractive index of said first optical waveguide, third and fourth end faces at which said second optical waveguide is exposed;

said second end face being inclined to a direction in which light is propagated through said first optical waveguide;

said third end face being inclined to a direction in which light is propagated through said second optical waveguide;

one of said first and second optical waveguides comprising an optical fiber;

one of said first and second optical waveguide chips which has said optical fiber having a substrate having a V groove of a V-shaped cross section or a U groove of a U-shaped cross section defined therein for placing the optical fiber therein, and a cover for fixing said optical fiber in the V or U groove;

said optical fiber being fixed in said V or U groove by said substrate and said cover;

the other of said first and second optical waveguides comprising an optical waveguide composed of a dielectric substrate with an impurity diffused therein;

said first optical waveguide chip and said second optical waveguide chip being disposed such that said second and third end faces extend substantially parallel to each other, and said first optical waveguide exposed at said second end face and said second optical waveguide exposed at said third end face are optically coupled directly to each other;

the arrangement being such that a portion of light propagated from said first optical waveguide to said second optical waveguide is reflected out of at least one of the first and second optical waveguide chips by at least one of said second end face of said first optical waveguide chip and said third end face of said second optical waveguide chip.

18. An optical component according to claim 17, wherein said dielectric substrate is made of $LiNbO_3$, $LiTaO_3$, glass, or a semiconductor.

19. An optical component according to claim 17, further comprising a light-detecting element for detecting the light which is reflected out of at least one of the first and second optical waveguide chips by at least one of said second end face and said third end face.

20. An optical component according to claim 17, further comprising a light-detecting element for detecting the light which is reflected out of at least one of the first and second optical waveguide chips by at least one of said second end face and said third end face, said first optical waveguide comprising an optical fiber, said cover being made of a material which passes light propagated through said optical fiber, said light-detecting element being fixed to said cover.

21. An optical component according to claim 17, further comprising a light source for introducing light into said second optical waveguide, and optical coupling means for optically coupling the light from said light source to said second optical waveguide which is exposed at said fourth end face.

22. An optical component according to claim 17, wherein each of said first and second optical waveguides comprises a plurality of parallel optical waveguides.

* * * * *